(12) United States Patent
Elliott

(10) Patent No.: US 10,650,818 B2
(45) Date of Patent: May 12, 2020

(54) SEMI-SUPERVISED QUESTION ANSWERING MACHINE

(71) Applicant: Flamingo AI Limited, Sydney (AU)

(72) Inventor: Jack Winston Elliott, Perth (AU)

(73) Assignee: FLAMINGO AI LIMITED, Perth WA (AU)

( * ) Notice: Subject to any disclaimer, the term of this patent is extended or adjusted under 35 U.S.C. 154(b) by 139 days.

(21) Appl. No.: 16/119,400

(22) Filed: Aug. 31, 2018

(65) Prior Publication Data

US 2020/0074999 A1    Mar. 5, 2020

(30) Foreign Application Priority Data

Aug. 30, 2018 (AU) ................................ 2018223010

(51) Int. Cl.
| | | |
|---|---|---|
| *G10L 15/22* | (2006.01) | |
| *G06F 16/31* | (2019.01) | |
| *G06F 16/332* | (2019.01) | |
| *G06F 16/901* | (2019.01) | |
| *G10L 15/26* | (2006.01) | |

(52) U.S. Cl.
CPC ............ *G10L 15/22* (2013.01); *G06F 16/313* (2019.01); *G06F 16/3329* (2019.01); *G06F 16/9024* (2019.01); *G10L 15/26* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 5,809,212 A | * | 9/1998 | Shasha | ..................... G06N 5/02 706/46 |
| 8,660,849 B2 | * | 2/2014 | Gruber | ................. G10L 15/183 704/275 |
| 8,670,979 B2 | * | 3/2014 | Gruber | .................... G10L 13/02 704/9 |

(Continued)

OTHER PUBLICATIONS

Examination Report 1 as received in Australian Application 2018223010 dated May 31, 2019.

(Continued)

*Primary Examiner* — Marcus T Riley
(74) *Attorney, Agent, or Firm* — Keller Jolley Preece

(57) ABSTRACT

Disclosed herein is a method for performing semi-supervised question answering. The method includes the steps of: (i) creating a graph based on input data, the input data comprising natural language text that includes seen questions, background text, and seen answers, and (ii) querying the graph in response to a new question. Querying the graph in response to a new question includes the steps of: projecting the question into the graph to a projected location; and for each node in a retrieval radius associated with the question, determining a set of answer weights based on the distances between retrieved nodes and the projected location and answer weights associated with retrieved nodes based on seen questions; and determining a best response corresponding to the seen answer associated with the highest answer weight from the set of answer weights determined for each retrieved node within the retrieval radius.

17 Claims, 12 Drawing Sheets

(56) References Cited

U.S. PATENT DOCUMENTS

| | | | | |
|---|---|---|---|---|
| 8,706,503 B2* | 4/2014 | Cheyer | | G06F 9/54 |
| | | | | 704/275 |
| 8,731,942 B2* | 5/2014 | Cheyer | | G10L 15/26 |
| | | | | 704/275 |
| 9,183,511 B2* | 11/2015 | Li | | G06N 20/00 |
| 9,197,736 B2* | 11/2015 | Davis | | G06F 3/04842 |
| 9,292,493 B2* | 3/2016 | Chandramouli | | G06F 40/30 |
| 9,575,963 B2* | 2/2017 | Pasupalak | | G10L 15/30 |
| 9,971,766 B2* | 5/2018 | Pasupalak | | G06F 40/295 |
| 9,971,774 B2* | 5/2018 | Badaskar | | G10L 15/26 |
| 10,452,783 B2* | 10/2019 | Pasupalak | | G06F 40/40 |
| 2007/0061335 A1* | 3/2007 | Ramer | | G10L 15/26 |
| 2011/0161076 A1* | 6/2011 | Davis | | G06F 3/04842 |
| | | | | 704/231 |
| 2013/0138428 A1* | 5/2013 | Chandramouli | | G06F 40/253 |
| | | | | 704/9 |
| 2013/0226846 A1* | 8/2013 | Li | | G06N 20/00 |
| | | | | 706/12 |
| 2014/0323142 A1* | 10/2014 | Rodriguez | | G06F 3/04842 |
| | | | | 455/452.1 |
| 2014/0337733 A1* | 11/2014 | Rodriguez | | G06F 3/04842 |
| | | | | 715/718 |
| 2015/0066479 A1* | 3/2015 | Pasupalak | | G06F 40/40 |
| | | | | 704/9 |
| 2017/0228367 A1* | 8/2017 | Pasupalak | | G06F 40/40 |
| 2017/0289341 A1* | 10/2017 | Rodriguez | | G06F 3/04842 |
| 2017/0364806 A1 | 12/2017 | Boyer | | |
| 2018/0144234 A1 | 5/2018 | Devesa | | |
| 2018/0260384 A1* | 9/2018 | Pasupalak | | G06F 40/40 |
| 2019/0180175 A1* | 6/2019 | Meteer | | G06F 40/289 |

OTHER PUBLICATIONS

Examination Report 2 as received in Australian Application 2018223010 dated Jul. 31, 2019.
Publication of Australian Application 2018223010 dated Sep. 26, 2019.
Notice of Patent Grant as received in Australian Application 2018223010 dated Jan. 9, 2020.
Certificate of Patent Grant as received in Australian Application 2018223010 dated Jan. 9, 2020.

* cited by examiner

SEMI-SUPERVISED QUESTION ANSWERING MACHINE

CROSS REFERENCE TO RELATED CASES

The present application is related to and claims priority to Australian Patent Application No. 2018223010 titled "Semi-supervised question answering machine" and filed in the name of Flamingo AI Limited on 30 Aug. 2018, the entire content of which is incorporated by reference herein.

FIELD OF THE INVENTION

The present disclosure relates to machine learning and, in particular, to a method and system that utilize semi-supervised machine learning to answer natural language questions, such as for use in a computer-implemented customer service user interface.

BACKGROUND OF THE INVENTION

Companies that receive large volumes of telephone calls or emails, or that operate at all hours, often employ computer-implemented customer service user interfaces to provide a consistent response to customers, minimize wait times, and minimize staffing costs.

One form of such a computer-implemented customer service user interface is an interactive voice response (IVR) system, which uses a computer to provide an interface with external customers, whereby the customers are able to navigate a menu provided by the IVR system through the use of voice recognition and/or Dual-Tone Multi-Frequency (DTMF) tones input through a telephone keypad, or the like. Companies may program the IVR systems with various states and flows among states, based on expected user responses. IVR systems are often employed for banking payments and services, retail orders, utilities, travel information, and weather conditions.

Another form or computer-implemented user interface is a chatbot, which utilizes artificial intelligence to conduct a conversation with a customer, such as via a textual exchange conducted in a display region of a webpage.

Existing customer user interface systems are relatively rigid, providing customers with a fixed set of options from which to choose. Some systems use question-answering machines, which are programmed to answer questions posed by humans in a natural language. Most natural language question-answering machines are rule-based systems composed of two types of rules: (i) "matching rules", which match natural language inputs to a response; and (ii) "response rules", which then react to this natural language. Both matching rules and response rules must be coded up in advance, being pre-programmed into a system, for the system to react meaningfully during real-time execution.

Other learning systems use a supervised learning approach. A machine is trained with a number of questions and corresponding sets of expected answers, strengthening the links between the best matches of questions and answers and weakening the links between incorrect questions and answers. Such a supervised learning approach requires a large amount of both questions and answers before results can be reasonably ascertained.

Thus, a need exists to provide an improved method and system for answering natural language questions in computer-implemented user interface systems.

SUMMARY

The present disclosure relates to a method and system utilizing semi-supervised machine learning to answer natural language questions.

A first aspect of the present disclosure provides a method for performing semi-supervised question answering, comprising the steps of:

creating a graph based on input data, the input data comprising natural language text that includes seen questions, background text, and seen answers, wherein creating the graph includes the steps of:
  transforming the input data into transformed text strings;
  comparing the transformed text strings to determine distances between the transformed text strings;
  structuring the transformed text strings and distances into a searchable graph, each text string having a corresponding node in the graph;
  matching nodes in the graph corresponding to seen questions with their corresponding seen answers;
  allocating, for each seen question, a standardized answer weight to the node in the graph that corresponds to that seen question; and
  propagating answer weights throughout the graph, such that for each seen question, the node in the graph corresponding to that seen question has a standardized answer weight for that seen question and neighbouring nodes in the graph have corresponding adjusted answer weights based on their respective distances from the node in the graph corresponding to the seen question;

querying the graph in response to a new question, including the steps of:
  projecting the question into the graph to a projected location; and
  for each node in a retrieval radius associated with the question, determining a set of answer weights based on the distances between retrieved nodes and the projected location and answer weights associated with retrieved nodes based on seen questions; and
  determining a best response corresponding to the seen answer associated with the highest answer weight from the set of answer weights determined for each retrieved node within the retrieval radius.

A second aspect of the present disclosure provides a system for performing semi-supervised question answering, comprising:

a graph creation builder adapted to create a graph based on input data, said input data comprising natural language text that includes seen questions, background text, and seen answers, wherein said graph creation builder includes:
  a translation pipeline for transforming received input data into transformed text strings suitable for machine comparison;
  a distance method processing module for comparing said transformed text strings to determine distances between said transformed text strings;
  an indexing system for structuring said transformed text strings and distances into a searchable graph, each text string having a corresponding node in said graph; and
a kriging engine for:
  matching nodes in the graph corresponding to seen questions with their corresponding seen answers;
  allocating, for each seen question, a standardized answer weight to the node in the graph that corresponds to that seen question; and
  propagating answer weights throughout the graph, such that for each seen question, the node in the graph corresponding to that seen question has a standardized answer weight for that seen question and neighbouring nodes in the graph have corresponding adjusted answer weights based on their respective distances from the node in the graph corresponding to the seen question;

a query engine adapted to query said graph in response to a new question, said query engine including computer readable instructions that when executed on a processor of said query engine perform the steps of:

projecting said question into said graph to a projected location; and for each node in a retrieval radius associated with the question, determining a set of answer weights based on the distances between retrieved nodes and said projected location and answer weights associated with retrieved nodes based on seen questions; and determining a best response corresponding to the seen answer associated with the highest answer weight from said set of answer weights determined for each retrieved node within the retrieval radius.

According to another aspect, the present disclosure provides an apparatus for implementing any one of the aforementioned methods.

According to another aspect, the present disclosure provides a computer program product including a computer readable medium having recorded thereon a computer program for implementing any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which.

Method steps or features in the accompanying drawings that have the same reference numerals are to be considered to have the same function(s) or operation(s), unless the contrary intention is expressed or implied.

DETAILED DESCRIPTION

Figure 1:
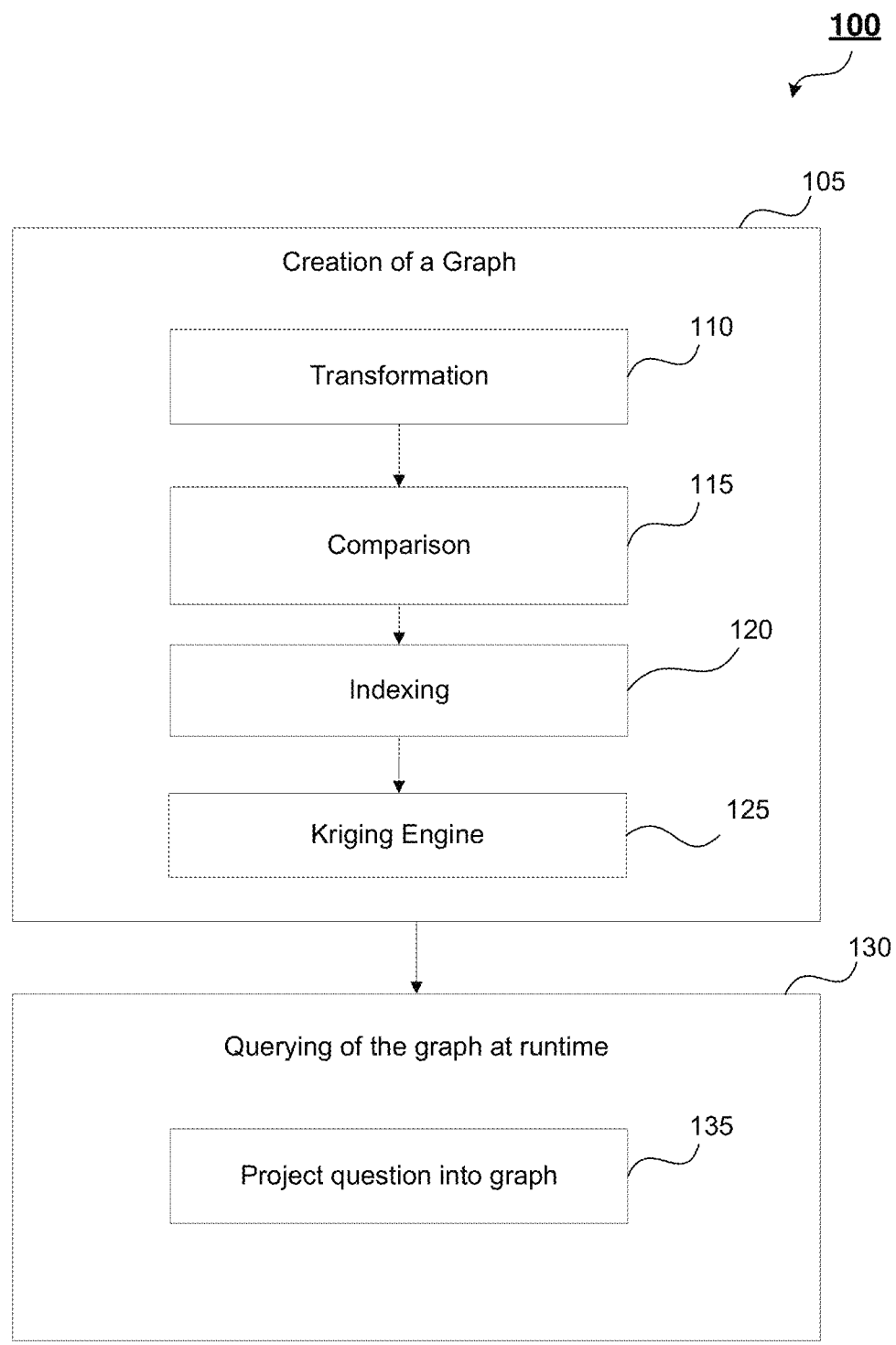
FIG. 1 is a flow diagram of a method for utilizing semi-supervised machine learning to answer natural language questions.

The present disclosure provides a method and system that utilize semi-supervised machine learning to answer natural language questions. In particular, the method and system treat finding the correct message as a density estimation exercise, by attempting to estimate the correctness of the right answer as a measure of the density of "correctness" around a specific point. The method and system of the present disclosure may find use in many different applications, but they are particularly suited to computer-implemented user interface systems, such as chatbots and the like.

Unlike the rule-based systems described above in relation to existing approaches, embodiments of the present disclosure gradually learn the mapping between natural language inputs and responses by studying user behaviour. Further, embodiments of the present disclosure are based on treating the problem as a space to be explored, rather than as a system to be trained. Consequently, the system starts learning from extremely small amounts of data, rather than waiting for large amounts of tagged training data to become available.

A method for performing semi-supervised question answering includes the steps of: creating a graph based on input data, wherein the input data comprises natural language text; and querying the graph in response to a question. Creating the graph includes the steps of transforming the input data into transformed text strings and then comparing the transformed text strings to determine distances between the transformed text strings. The method structures the transformed text strings and distances into a searchable graph, wherein each text string has a corresponding node in the graph. The method matches nodes in the graph corresponding to seen questions with their corresponding seen answers and allocates, for each seen question, a standardized answer weight to the node in the graph that corresponds to that seen question. The method then distributes all nodes throughout the graph. Different embodiments apply weightings in various ways between nodes distributed throughout the graph.

As noted above, the input data on which the graph is based comprises natural language text that includes seen questions, background text, and seen answers. Further, distributing the nodes throughout the graph includes propagating answer weights throughout the graph, such that for each seen question, the node in the graph corresponding to that seen question has a standardized answer weight for that seen question and neighbouring nodes in the graph have corresponding adjusted answer weights based on their respective distances from the node in the graph corresponding to the seen question. The neighbouring nodes are not restricted to nodes that relate to seen questions, rather the neighbouring nodes may relate to both seen questions and background text.

In one arrangement, distributing the transformed text strings throughout the graph is performed using an hierarchical navigable small-world index. This index is then enriched by a Kriging engine. The input data may include a set of questions, file contents, or a combination thereof. The input data may be transformed in different ways, such as one or more rows in a matrix. In one implementation, the graph is a matrix weighted using a TF-IDF transform. In one implementation, string kernels are used as the distance measure—so the input data is maintained as a string.

Querying the graph in response to a new question occurs during runtime, with the new question received as an input from a user. The new question may be a seen question or an unseen question. The user may be, for example, a caller speaking on a telephone to an interactive voice response (IVR) system, or a user accessing a computing device to provide a question to a user interface of a website or software application ("app") operated by a company, such as a chatbot. Querying the graph includes the step of projecting the question into the graph to a projected location. Depending on the implementation, the method generates a question node at the projected location. If the projected question finds at least one matching node close-by in the graph (i.e., within a retrieval radius associated with the projected question) and there is an answer associated with one of the matching nodes, then the method selects a best answer from the answers associated with the matching nodes, as described below. Otherwise, the question is escalated. Depending on the scenario, escalating the question may include diverting the question to a human operator or asking the user associated with the question to rephrase the question, in anticipation that the same question rephrased using different words may match a node in the graph.

Identifying matching nodes within the retrieval radius associated with a new question includes determining a set of answer weights based on the distances between the projected location and retrieved nodes and answer weights associated with retrieved nodes based on seen questions. The method determines a best response corresponding to the seen answer associated with the highest answer weight from the set of answer weights determined for each retrieved node within the retrieval radius.

The method of the present disclosure includes two distinct phases: (i) creation of a graph; and (ii) querying of that graph at runtime. FIG. 1 is a flow diagram of one embodiment of a method 100 for utilizing semi-supervised machine learning to answer natural language questions. The method 100 includes a graph creation phase 105 and a graph querying phase 130. In the embodiment of FIG. 1, the graph creation phase 105 includes four distinct steps (or components): transformation 110, comparison 115, indexing 120, and distribution of answer 'weights' using a Kriging engine 125. The graph querying phase 130 is shown as including a projection step 135, in which one or more natural language text strings, corresponding to at least one newly received question, are projected into the graph created in the graph creation phase 105 in order to obtain an answer. Each of the components 105, 110, 115, 120, 125, 135 may be implemented in many ways; that is, the method can use any transformation, comparison, or index. For example, one arrangement uses a Term Frequency-Inverse Document Frequency (TF-IDF) transformation with a cosine distance, a hierarchical navigable small world index, and kriging constrained to three hops.

In one implementation, a first server executes a graph builder program to create the graph and a second server performs the querying during runtime. In such an implementation, the first server runs once, producing a graph file-structure, and the second server subsequently executes a query service, using the graph produced by the graph builder of the first server to answer queries received from client requests. In an alternative implementation, a single server is used to create the graph and perform the runtime querying.

Figure 2:
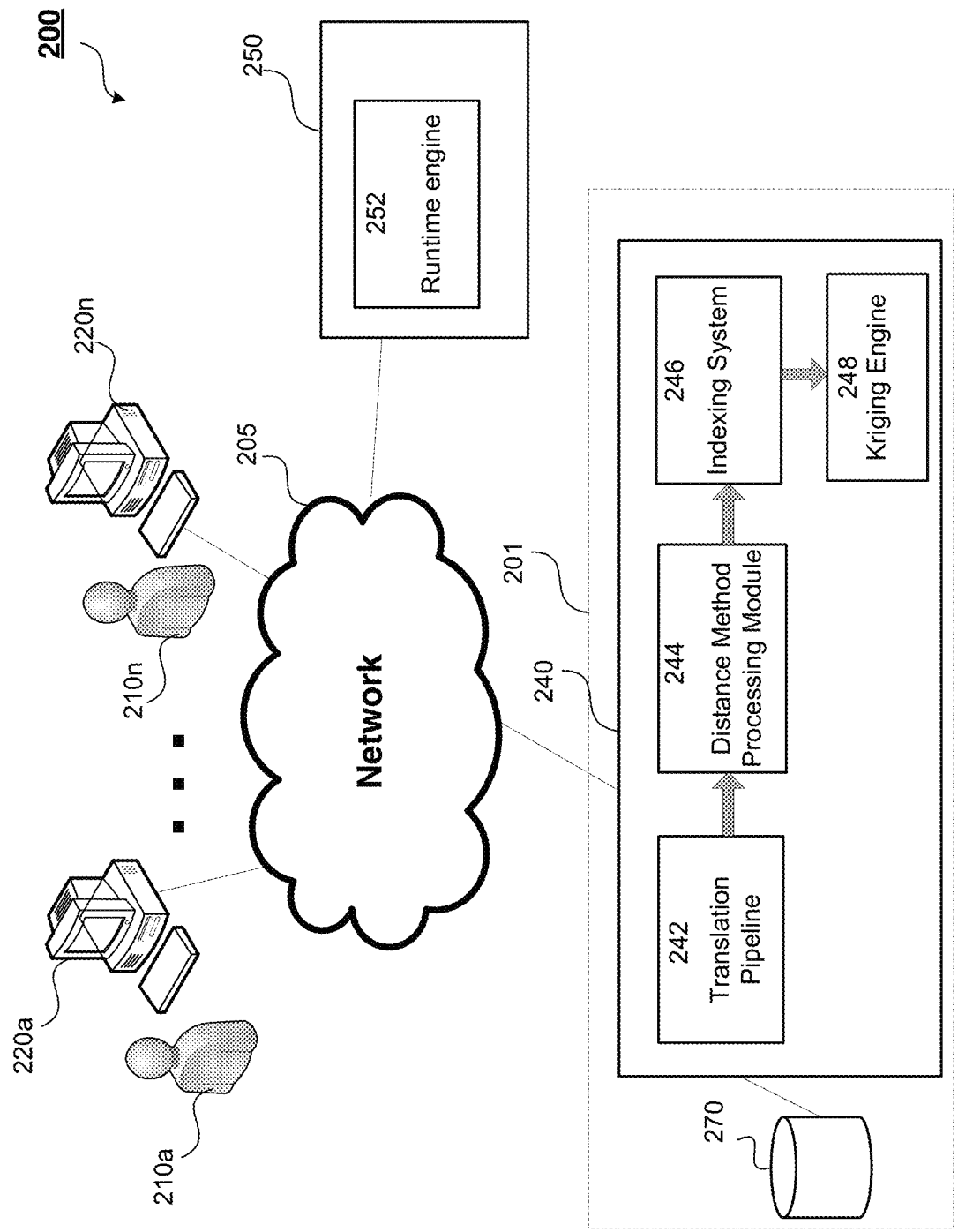
FIG. 2 is a schematic representation of a system on which one or more embodiments of the present disclosure may be practiced.

FIG. 2 is a schematic block diagram representation of a system 200 on which an embodiment of the present disclosure may be practiced. The system 200 includes a graph creation server 201 for creating a graph and a query server 250 for performing runtime queries on the graph in response to natural language questions received from one or more users 210*a* . . . 210*n* accessing corresponding computing devices 220*a* . . . 220*n*.

As shown in the system 200 of FIG. 2, one embodiment uses a graph creation server 201 that includes four components:

i. a translation pipeline 242 that takes natural language text and transforms the natural language text into transformed text that a machine can compare;

ii. a distance method processing module 244 that receives the transformed text from the translation pipeline 242 and measures other transformed text;

iii. an indexing system 246 such that these distances are structured together into a network, generating a graph; and iv. a kriging engine 248 that takes measurements and "pushes" those measurements through the network.

The query server 250 includes a runtime engine 252 for executing runtime queries on the graph created by the graph creation server 201. In the example of FIG. 2, each of the graph creation server 201 and the query server 250 is connected to a communications network 205. Each of the computing devices 220*a* . . . 220*n* is also connected to the communications network 205. The communications network 205 may be implemented using one or more wired or wireless transmission links and may include, for example, a dedicated communications link, a local area network (LAN), a wide area network (WAN), the Internet, a telecommunications network, or any combination thereof.

In one embodiment, the graph creation server 201 and the query server 250 constitute a semi-supervised machine learning system for use in relation to a chatbot, a computer-implemented interface for conducting a conversation with a user to simulate a conversation with a human operator. Such a chatbot may be implemented, for example, in relation to a customer service or information acquisition application.

The graph creation server 201 receives a set of input training data comprised of natural language text. The natural language text may include seen questions, background text, seen answers, or a combination thereof. The training data may be presented as one or more files, a set of natural language questions, or a combination thereof. In one example, the input training data is received from an external database 270 coupled to the graph creation server 201 either directly, as shown, or via the communications network 205 or any other connection means.

The translation pipeline 242 transforms the received textual input data into a format intelligible to the selected distance method. For cosine distances, for example, the text is transformed into a Term-Frequency Inverse Document Frequency weighted matrix. For string kernels and string distance measurements, the text is kept as a string. The transformed text is then presented to the distance method processing module 244, which compares the transformed text strings to determine respective distances between the transformed text strings. The indexing system 246 constructs a graph from the transformed text strings and the determined distances. In one arrangement, each text string has a corresponding node in the graph. The graph creation server 201 then distributes the nodes throughout the graph. One arrangement uses a Kriging engine 248 to distribute answer 'weights' over the nodes. Other arrangements place an answer weight only on the nodes themselves, not propagating this weight beyond the nodes in question.

Once the graph creation server 201 has created a graph from the set of input training data, the graph can be used to perform a chat session with one of the users 210*a* . . . 210*n*. For example, user 210*a* accesses the computing device 220*a* to communicate with a website hosted in association with the query server 250. The query server 250 presents a graphical user interface to a display of the computing device 220*a*, wherein the graphical user interface may include a display region for presenting a textual chat session. The user 210a uses an input device, such as a keyboard or microphone, to provide a natural language query to the query server 250 via the computing device 220a and the communications network 205.

The query server 250 receives the query and projects the query into the graph created by the graph creation server 201. In one embodiment, the query server 250 has its own onboard copy of the built graph, which may be stored on a storage medium forming part of the runtime engine 252 or on an external drive, either co-located with the runtime engine 250 or accessed by the runtime engine 252 via the network 205.

Projecting the query into the graph seeks to identify a matching node in the graph. Many different transforms from text to the machine queryable 'space' of the created graph are possible. One implementation uses a TF-IDF weighted document score matrix. Another implementation uses neural nets to generate a synthetic space. Other spaces include the strings themselves (which are then measured using string kernels) or keyword only projections.

The query is projected into the graph to a projected location. The method then examines each node within a retrieval radius. The retrieval radius may vary depending on the application. The retrieval radius may be associated with the query or may be predefined or alternatively may be defined by a user during query runtime. When these nodes are returned, each answer on each node has a certain weight, representing the density of the correctness of that particular answer at that point (node). This number is typically valued between 0 (completely incorrect) and 1 (completely accurate).

In one arrangement, the method selects the closest n nodes to be returned by the query engine, and kriging is used to propagate answer weights from the found nodes to the query (i.e., question) node. The method then selects the highest score for each answer. This results in a list of answers (which were placed on the query nodes) and weights. The highest score is a more likely answer for the query than a low-weighted answer.

When the query server 250 identifies a matching node for the query, the query server 250 determines if there is an answer associated with the found node. If there is such an associated answer, the query server 250 returns the answer to the chatbot session for display on the computing device 220a. If there is no answer, then the query server 250 may escalate the query. In one implementation, escalating the query generates an alert for a human operator to join the chatbot session.

When the query server 250 fails to identify a matching node for the query, the query server 250 may ask the user 210a to rephrase the query, as the same query presented using different language may have a matching node. In an alternative arrangement, when the runtime serve 250 fails to identify a matching node for the query, the query server 250 escalates the query, such as by generating an alert for a human operator to join the chatbot session.

Figure 12:
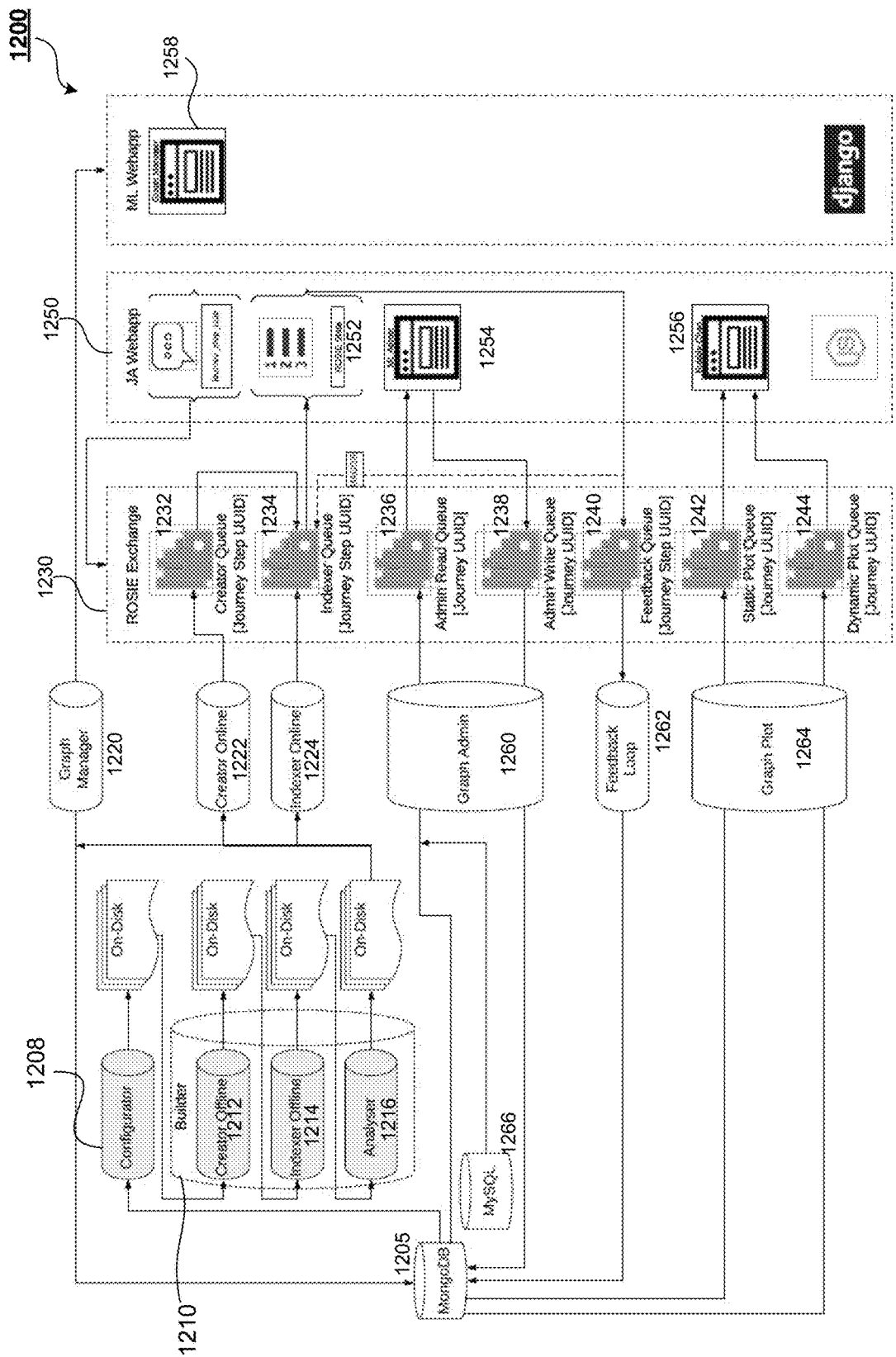
FIG. 12 is a schematic block diagram representation of an architecture for a machine learning system.

FIG. 12 is a schematic block diagram representation of an architecture 1200 for a machine learning system. The architecture 1200 includes a database 1205 that presents information to a Configurator 1208. In one example, the database 1205 is implemented using MongoDB, an open-source cross-platform document-oriented database program.

The Configurator 1208 retrieves a set of documents from an online database, and places them to a local disk store. This store is consumed by a Builder 1210. The Builder 1210 creates a graph from input data received from the database 1205 and includes a Creator Offline 1212, an Indexer Offline 1214, and an Analyzer 1216. The Creator Offline 1212 is responsible for transforming text into a machine-readable format—step 110 in FIG. 1 and step 610 of FIG. 6.

The Indexer Offline 1214 is responsible for inserting each transformed node into the graph. This process is outlined in steps 115 and 120 of FIG. 1. A detailed view is presented in steps 620 and 615 of FIG. 6. Each transformed node is taken into the index and compared selectively against other points.

The Analyzer is responsible for inserting answer weights and kriging that information throughout the graph (step 125 in FIG. 1). The output of the Builder 1210 is presented as inputs to each of a Graph Manager 1220, a Creator Online 1222, and an Indexer Online 1224. The Graph Manager 1220 feeds both a Machine Learning (ML)-based web application 1258 and the database 1205.

When a chatbot or virtual agent (realized here as the JA Webapp 1250) needs a response from natural language, a message is placed in the Rosie Exchange 1230. Like its offline analogue, the Creator Online 1222 transforms this message into the format required by our distance measure (510 in FIG. 5). The transformed message is then placed back into the Rosie Exchange where it is consumed by the Indexer Online 1224, which then queries the graph and matches appropriate answer weights (Step 520 in FIG. 5). These components are collectively responsible for step 135 of FIG. 1.

In particular, the output from the Creator Online 1222 is presented to a Creator Queue 1232, which presents an output as an input to an Indexer Queue 1234, which also receives as an input the output from the Indexer Online 1224. The Indexer Queue sorts entries for a Journey Assist (JA) Webapp 1250.

Figure 7:
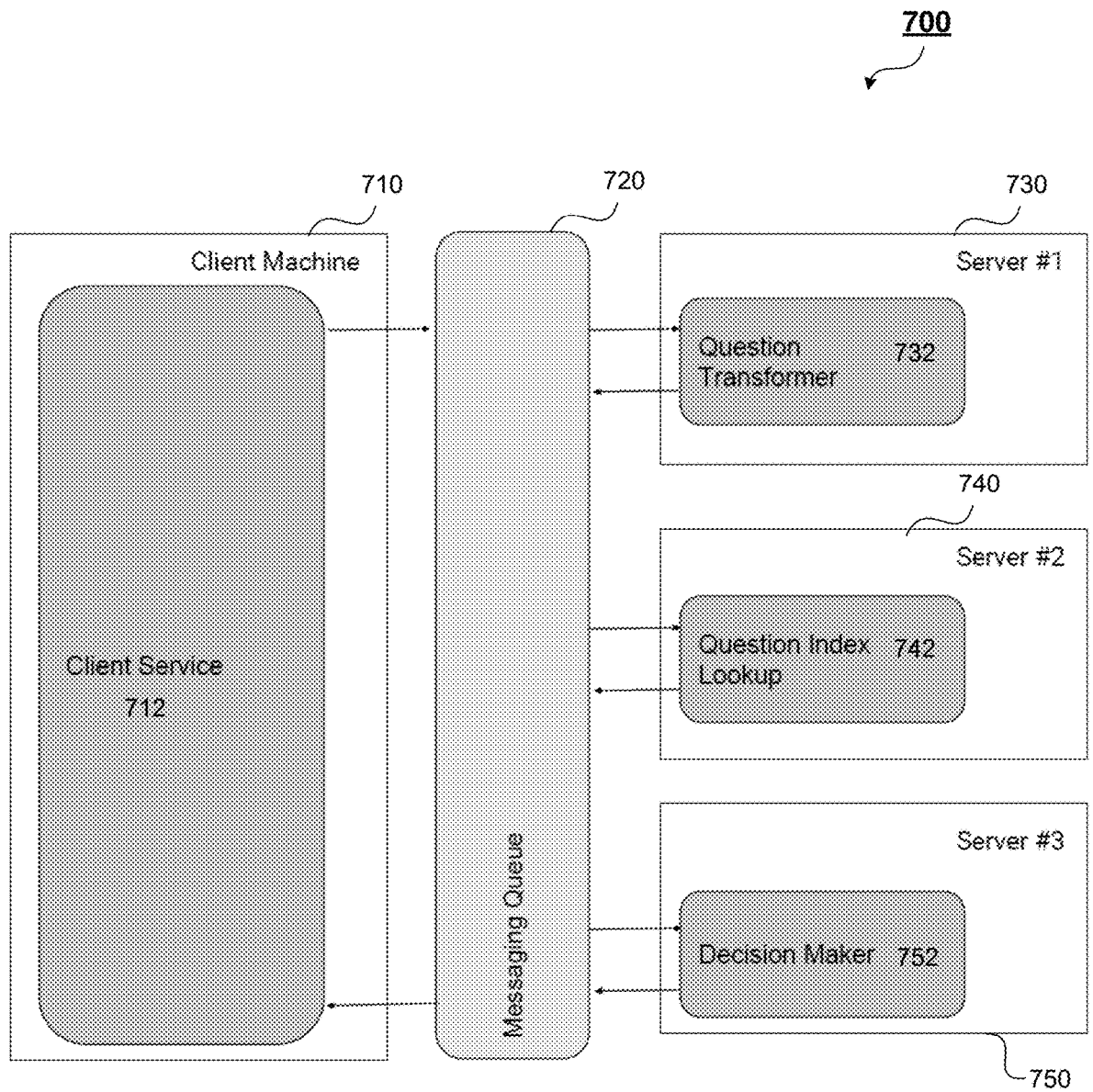
FIG. 7 is a schematic representation of information flow during query runtime.

An alternative view of this architecture is presented in FIG. 7, which is a schematic representation of information flow 700 during query runtime. In FIG. 7, we can see a question transformer 732 takes a message from a queue 720, transforms that message and places it back on the queue. A Question Index Lookup 742 is analogous to the Indexer Online 1234. The lookup results are then fed to a decision maker 752. Further details of FIG. 7 are discussed below.

The architecture 1200 also includes a Graph Admin 1260, which receives an input from the database 1205 and an SQL database 1266 and presents an output to an Admin Read Queue 1236 in the Rosie Exchange 1230. The Admin Read Queue 1236 presents an output to an ML Admin 1254, which returns information to an Admin Write Queue 1238. The Admin Write Queue 1238, in turn, presents an input to the Graph Admin 1260, which feeds back to the database 1205.

The Rosie Exchange 1230 further includes a Feedback Queue 1240 and a Feedback Loop 1262. In this configuration, the datastore is informed of new answers or improvements to existing answers by placing an appropriate message on the Feedback Queue 1240. The Feedback Loop 1262 then takes this message and updates the database 1205. In this way, new information will be available to the Configurator 1208 and Builder 1210 when they next run.

Figure 3:
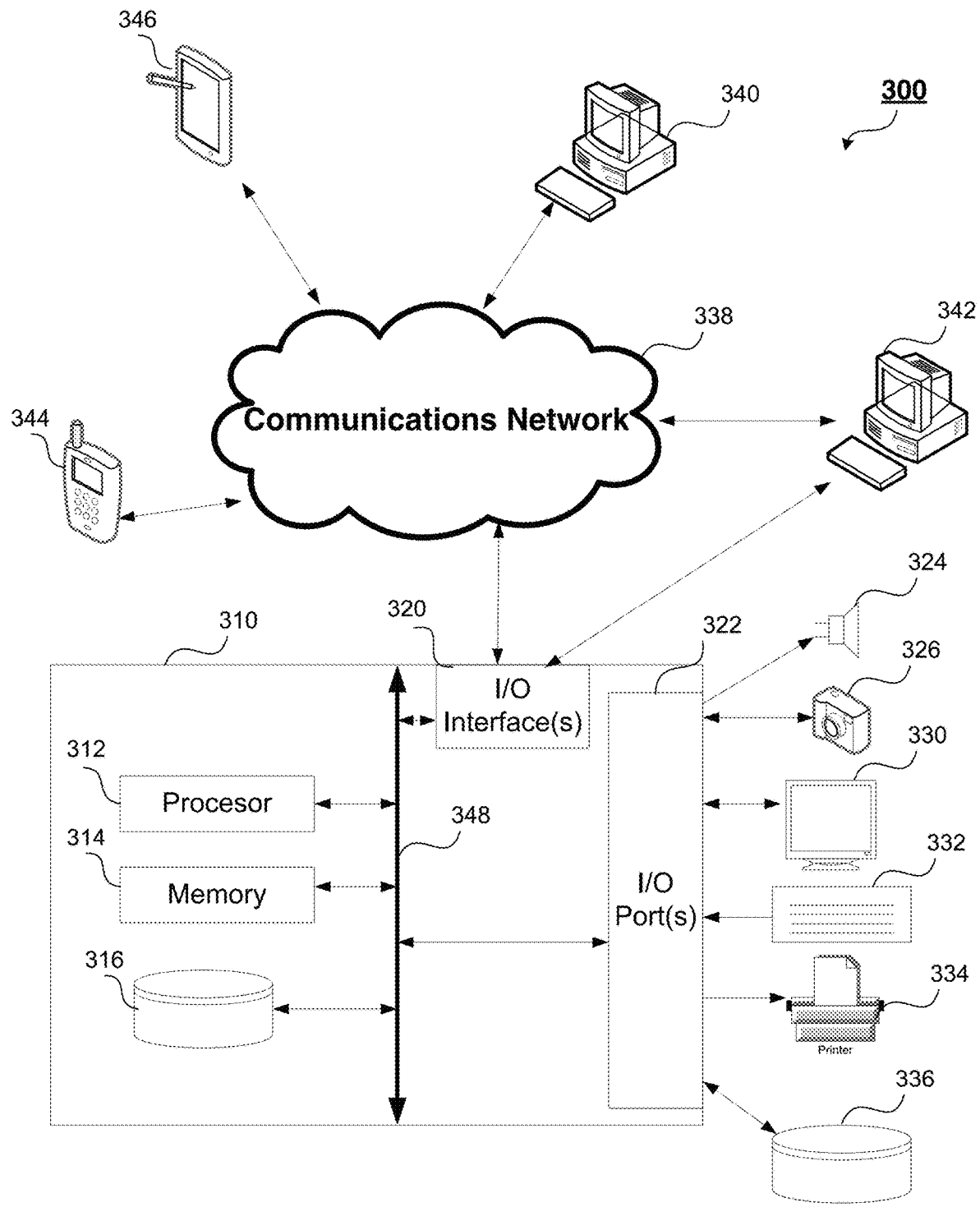
FIG. 3 is a schematic block diagram representation of a system that includes a general-purpose computer on which one or more embodiments of the present disclosure may be practiced.

The semi-supervised question answering machine of the present disclosure may be practiced using one or more computing devices, such as a general-purpose computer or computer server. FIG. 3 is a schematic block diagram of a system 300 that includes a general-purpose computer 310. The general-purpose computer 310 includes a plurality of components, including: a processor 312, a memory 314, a storage medium 316, input/output (I/O) interfaces 320, and input/output (I/O) ports 322. Components of the general-purpose computer 310 generally communicate using one or more buses 348.

The memory 314 may be implemented using Random Access Memory (RAM), Read Only Memory (ROM), or a combination thereof. The storage medium 316 may be implemented as one or more of a hard disk drive, a solid state "flash" drive, an optical disk drive, or other storage means. The storage medium 316 may be utilized to store one or more computer programs, including an operating system, software applications, and data. In one mode of operation, instructions from one or more computer programs stored in the storage medium 316 are loaded into the memory 314 via the bus 348. Instructions loaded into the memory 314 are then made available via the bus 348 or other means for execution by the processor 312 to implement a mode of operation in accordance with the executed instructions.

One or more peripheral devices may be coupled to the general-purpose computer 310 via the I/O ports 322. In the example of FIG. 3, the general-purpose computer 310 is coupled to each of a speaker 324, a camera 326, a display device 330, an input device 332, a printer 334, and an external storage medium 336. The speaker 324 may be implemented using one or more speakers, such as in a stereo or surround sound system. In the example in which the general-purpose computer 310 is utilized to implement a first server for creating a graph, one or more peripheral devices may relate to storage devices connected to the I/O ports 322.

The display device 330 may be a computer monitor, such as a cathode ray tube screen, plasma screen, or liquid crystal display (LCD) screen. The display 330 may receive information from the computer 310 in a conventional manner, wherein the information is presented on the display device 330 for viewing by a user. The display device 330 may optionally be implemented using a touch screen to enable a user to provide input to the general-purpose computer 310. The touch screen may be, for example, a capacitive touch screen, a resistive touchscreen, a surface acoustic wave touchscreen, or the like.

The input device 332 may be a keyboard, a mouse, a stylus, drawing tablet, or any combination thereof, for receiving input from a user. The external storage medium 336 may include an external hard disk drive (HDD), an optical drive, a floppy disk drive, a flash drive, solid state drive (SSD), or any combination thereof and may be implemented as a single instance or multiple instances of any one or more of those devices. For example, the external storage medium 336 may be implemented as an array of hard disk drives.

The I/O interfaces 320 facilitate the exchange of information between the general-purpose computing device 310 and other computing devices. The I/O interfaces may be implemented using an internal or external modem, an Ethernet connection, or the like, to enable coupling to a transmission medium. In the example of FIG. 3, the I/O interfaces 322 are coupled to a communications network 338 and directly to a computing device 342. The computing device 342 is shown as a personal computer, but may be equally be practiced using a smartphone, laptop, or a tablet device. Direct communication between the general-purpose computer 310 and the computing device 342 may be implemented using a wireless or wired transmission link.

The communications network 338 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general-purpose computer 310 is able to communicate via the communications network 338 to other computing devices connected to the communications network 338, such as the mobile telephone handset 344, the touchscreen smartphone 346, the personal computer 340, and the computing device 342.

One or more instances of the general-purpose computer 310 may be utilized to implement a first server to create a graph or a second server for performing runtime queries in relation to the graph in accordance with the present disclosure. In such an embodiment, the memory 314 and storage 316 are utilized to store data relating to graph data. Software for implementing the semi-supervised machine learning machine system is stored in one or both of the memory 314 and storage 316 for execution on the processor 312. The software includes computer program code for implementing method steps in accordance with the method of semi-supervised question answering described herein.

Figure 4:
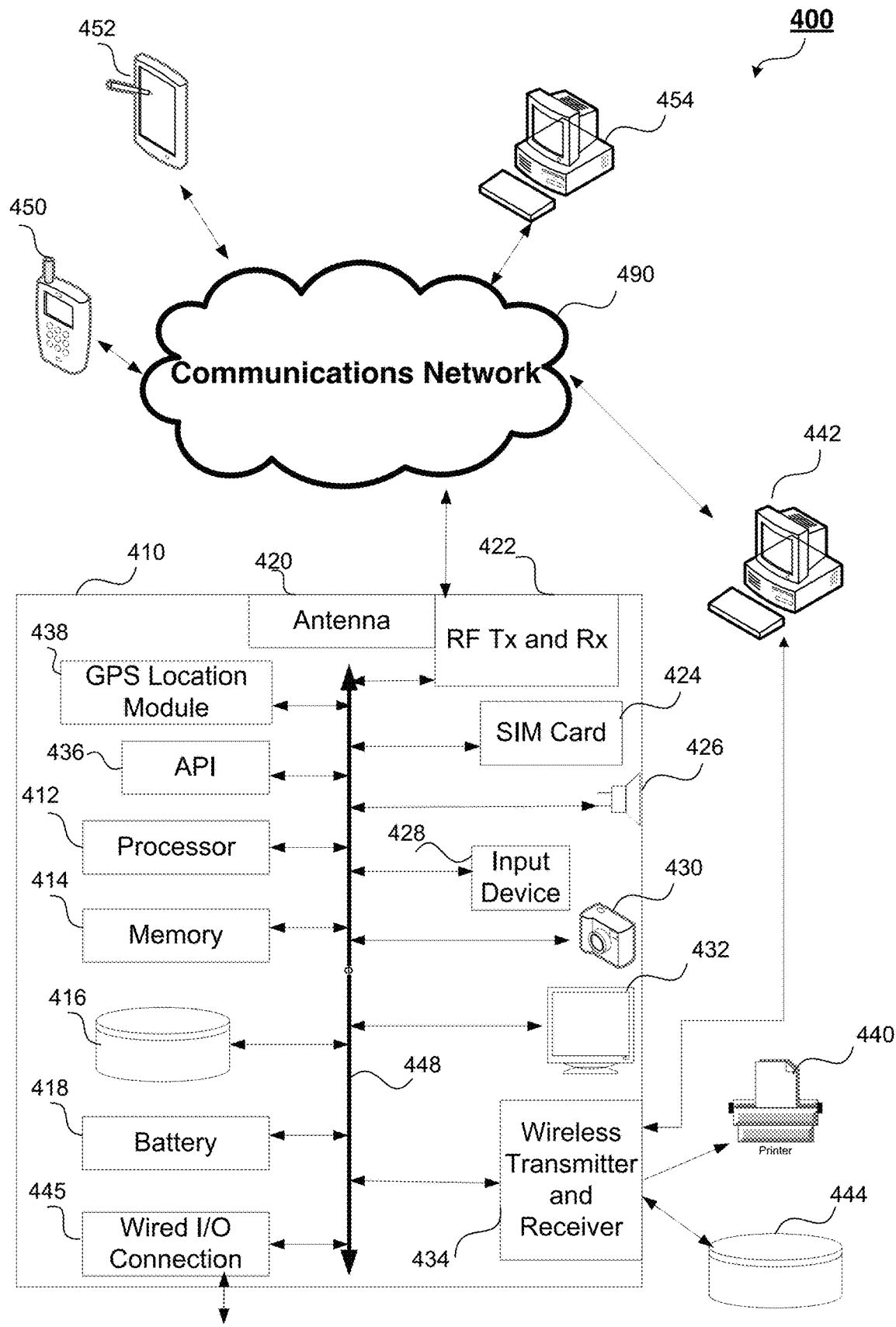
FIG. 4 is a schematic block diagram representation of a system that includes a general smartphone on which one or more embodiments of the present disclosure may be practiced.

FIG. 4 is a schematic block diagram of a system 400 on which one or more aspects of a semi-supervised question answering method and system of the present disclosure may be practiced. The system 400 includes a portable computing device in the form of a smartphone 410, which may be used by a registered user of the semi-supervised question answering system of FIG. 2. The smartphone 410 includes a plurality of components, including: a processor 412, a memory 414, a storage medium 416, a battery 418, an antenna 420, a radio frequency (RF) transmitter and receiver 422, a subscriber identity module (SIM) card 424, a speaker 426, an input device 428, a camera 430, a display 432, and a wireless transmitter and receiver 434. Components of the smartphone 410 generally communicate using one or more bus connections 448 or other connections therebetween. The smartphone 410 also includes a wired connection 445 for coupling to a power outlet to recharge the battery 418 or for connection to a computing device, such as the general-purpose computer 310 of FIG. 3. The wired connection 445 may include one or more connectors and may be adapted to enable uploading and downloading of content from and to the memory 414 and SIM card 424.

The smartphone 410 may include many other functional components, such as an audio digital-to-analogue and analogue-to-digital converter and an amplifier, but those components are omitted for the purpose of clarity. However, such components would be readily known and understood by a person skilled in the relevant art.

The memory 414 may include Random Access Memory (RAM), Read Only Memory (ROM), or a combination thereof. The storage medium 416 may be implemented as one or more of a solid state "flash" drive, a removable storage medium, such as a Secure Digital (SD) or microSD card, or other storage means. The storage medium 416 may be utilized to store one or more computer programs, including an operating system, software applications, and data. In one mode of operation, instructions from one or more computer programs stored in the storage medium 416 are loaded into the memory 414 via the bus 448. Instructions loaded into the memory 414 are then made available via the bus 448 or other means for execution by the processor 412 to implement a mode of operation in accordance with the executed instructions.

The smartphone 410 also includes an application programming interface (API) module 436, which enables programmers to write software applications to execute on the processor 412. Such applications include a plurality of instructions that may be pre-installed in the memory 414 or downloaded to the memory 414 from an external source, via the RF transmitter and receiver 422 operating in association with the antenna 420 or via the wired connection 445.

The smartphone 410 further includes a Global Positioning System (GPS) location module 438. The GPS location module 438 is used to determine a geographical position of the smartphone 410, based on GPS satellites, cellular telephone tower triangulation, or a combination thereof. The determined geographical position may then be made available to one or more programs or applications running on the processor 412. The geographical position may be used to customize one or more display regions of a user interface or to customize or filter search results.

The wireless transmitter and receiver 434 may be utilized to communicate wirelessly with external peripheral devices via Bluetooth, infrared, or other wireless protocol. In the example of FIG. 4, the smartphone 410 is coupled to each of a printer 440, an external storage medium 444, and a computing device 442. The computing device 442 may be implemented, for example, using the general-purpose computer 310 of FIG. 3.

The camera 426 may include one or more still or video digital cameras adapted to capture and record to the memory 414 or the SIM card 424 still images or video images, or a combination thereof. The camera 426 may include a lens system, a sensor unit, and a recording medium. A user of the smartphone 410 may upload the recorded images to another computer device or peripheral device using the wireless transmitter and receiver 434, the RF transmitter and receiver 422, or the wired connection 445.

In one example, the display device 432 is implemented using a liquid crystal display (LCD) screen. The display 432 is used to display content to a user of the smartphone 410. The display 432 may optionally be implemented using a touch screen, such as a capacitive touch screen or resistive touchscreen, to enable a user to provide input to the smartphone 410.

The input device 428 may be a keyboard, a stylus, or microphone, for example, for receiving input from a user. In the case in which the input device 428 is a keyboard, the keyboard may be implemented as an arrangement of physical keys located on the smartphone 610. Alternatively, the keyboard may be a virtual keyboard displayed on the display device 432. In the case in which the input device 428 is a microphone, the microphone may be associated with speech recognition software for transforming received audible speech into text.

The SIM card 424 is utilized to store an International Mobile Subscriber Identity (IMSI) and a related key used to identify and authenticate the user on a cellular network to which the user has subscribed. The SIM card 424 is generally a removable card that can be used interchangeably on different smartphone or cellular telephone devices. The SIM card 424 can be used to store contacts associated with the user, including names and telephone numbers. The SIM card 424 can also provide storage for pictures and videos. Alternatively, contacts can be stored on the memory 414.

The RF transmitter and receiver 422, in association with the antenna 420, enable the exchange of information between the smartphone 410 and other computing devices via a communications network 490. In the example of FIG. 4, RF transmitter and receiver 422 enable the smartphone 410 to communicate via the communications network 490 with a cellular telephone handset 450, a smartphone or tablet device 452, a computing device 454 and the computing device 442. The computing devices 454 and 442 are shown as personal computers, but each may be equally be practiced using a smartphone, laptop, or a tablet device.

The communications network 490 may be implemented using one or more wired or wireless transmission links and may include, for example, a cellular telephony network, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a cellular (mobile) telephone cellular network, a short message service (SMS) network, or any combination thereof.

Graph creation starts with a transformation step 510, which utilizes a translation pipeline to transform a set of input data into a structure that is understood by a distance measure. The input data comprises text 505. The actual format of the input data may vary, depending on the particular application. In one embodiment, the input data is presented as a set of one or more text files. In another embodiment, the input data is a set of questions, each of which may be associated with a corresponding answer.

Each distance measure only understands a certain type of transformation. So, transformations are chosen for their suitability with respect to certain distance measures. That is, distance measures are chosen for their suitability with respect to the exact purpose of the deployment. Sometimes detailed client-specific questions are asked, in which case the method selects transformations that emphasize keywords or 'content words'. In other applications, the method must answer very short pieces of small talk, phrases not much longer than "hello", in which case the method may be implemented using transformations on the letters themselves, or using a transformation that emphasizes the whole string. Many distance measures may be utilized, depending on the particular application, including, but not limited to, non-metric distances such as Kullback-Leibler divergence and Levenshtein Distance.

In one embodiment, the translation pipeline, being the first component of the graph creation phase, transforms input text into a matrix weighted using a TF-IDF transform, where each word in the matrix is a column, and each message is a row. This sparse matrix is mostly unpopulated, as most words appear only in a handful of messages. The words are then reweighted according to how infrequently the respective words appear in all the seen messages. This means that words that appear infrequently are upweighted, and words that appear infrequently are downweighted.

Different embodiments may utilize different transformations. One embodiment utilizes keywords as a transformation, while an alternative embodiment utilizes a matrix. A further embodiment takes a raw text string input and proceeds to use string kernels as the distance measure.

The translation pipeline can be understood as a projection into a space, whereas the distance method processing module may be understood as applying a method of comparing objects within that space, and the indexing system is a way of matching nearby objects efficiently against each other. Note that these are not necessarily singular instances; that is, multiple transformations and distance measures can be supported at the same time, with a final distance measure incorporating the underlying distances appropriately.

The translation pipeline may be implemented using any transform that makes distance measure(s) meaningful. The distance measure is any kind of mathematical construct that takes a pair of these transformed objects and returns a single value. The cardinal example of a distance measure is Euclidean distance, where the distance between two points is defined "as the crow flies". Other types of distance include cosine distance (an angular distance measurement) and Levenshtein distance, which measures the distance between two strings directly, without any recourse to transformation. The indexing method may be exact or approximate. The kriging method takes the graph created by the indexing method and propagates values around the graph.

After the transformation, the method specifies a distance measure that enables measurement of the similarity of different messages to each other. One implementation uses cosine distance defined as:

$$\frac{\sum_{i=1}^{n} A_i B_i}{\sqrt{\sum_{i=1}^{n} A_i^2} \sqrt{\sum_{i=1}^{n} B_i^2}}$$

The measurement of distance may be determined in many different ways, provided that each distance is freely convertible into a kernel affinity measure.

Next, the indexing is performed 520: this index builds a graph, elements defined as close by the distance measure are connected by links. Each link forms a tuple, with the identifiers of both the destination and origin nodes, together with the distance between those two nodes. This distance is then converted into an affinity measure, making the links a weight ranging from zero to one. This weight is constructed such that the full-rank matrix, consisting of the affinities between each point to every other point, is a positive definite matrix. The matrix is a kernel matrix.

The kernel matrix utilized here is not full rank; it is the partial realization of the full-rank kernel matrix, where only close elements are linked together. Rather than attempting to calculate or manipulate optimal measures across the entire kernel, reasoning is kept local.

With the graph and kernel measures in hand, kriging is now done across the graph. This means that questions with reliable answers are given a weight, and that weight is propagated across the graph according to the kriging algorithm. Kriging proceeds by taking a graph, and injecting a number into the graph at a node. Points neighbouring the injected node take the value of the injected node reweighted according to some kriging formula (either multiplying by a similarity, or using some other graph kriging method).

Kriging ensures that the "answer weight" is distributed around the graph, either throughout the graph, or in the immediate proximity of the question matched to that answer. At each question that has an answer, the method injects a weight into the system, and pushes that weight through the graph. After Kriging, each node in the graph now has weight for each answer. This weight is the relative strength of that answer at that point in the graph.

This ends the creation of the graph itself. In one embodiment, the graph creation server emits the constructed a graph as a file structure. It is this file structure that is read in by the query server 250 to respond to consumer requests.

Before the second phase—query answering—can begin, one arrangement starts a query server. A query server reads the graph output from the building process, listens for client requests, and responds to those received requests by searching the graph in the manner outlined below.

When a question is asked, the query server retrieves from the graph the closest nodes to the asked question, together with an affinity score to each of these nodes. The answer weight for every answer at each of these nodes is then multiplied by the affinity between the node and the asked question. These weights are then consolidated by answer, so each answer has a single weight with respect to the received query. The consolidated question weight is the strength of each answer at that query point.

Answer weight lookup can be understood as virtually adding a node to the graph, and then pushing the kriging weights through to that virtual node. With a list of consolidated question weights in hand, the strongest answer weight can be understood as the best match, and the weakest answer weight as the worst match.

Because the query server returns all possible answers that are close by, it is useful to refine the potential answers (done by the decision maker 530). Many possible mechanisms of refinement are possible, but the simplest is simply sorting the responses from highest to lowest and picking the first one. This top-ranked answer is the "best" answer for the query.

Let us consider an example in which an insurance company wants to deploy a chatbot to handle questions about their best-selling insurance product. Any question answered will be one less call to insurance company's call centre, so automation of this facility is essential. The company does not know what kind of questions consumers have about insurance. If the insurance company knew which questions would be asked, the company could provide readily accessible information on their website and in their marketing materials.

The insurance company then constructs a corpus of questions they feel are top-most in the minds of consumers. These questions and their answers are presented in plain-text and are not structured in any way. This question set forms the basis of an initial training set (i.e., an input data set) for the semi-supervised question answering machine.

The initial training set is structured into a network graph by the graph builder (i.e., the graph creation server 201), which also adds the kriging information, matching questions with answers. It is this network graph which will be consumed by the query server 250 at runtime.

Depending on the application, the constructed network graph can be studied, queried, and analyzed ahead of time. This is a time to apply any tuning in the distance measurement or transformations that turn pieces of text into nodes in the network. One easy way to look at the graph is to study the dispersion of kriging information; if this is highly localized or degenerate in some way, the graph can be tweaked accordingly. This tuning and performance management is guided by staff, using automated tools that generate reports and automated processes that rebuild graphs using configuration files.

Once the insurance company is satisfied with the performance and structure of the constructed graph, the insurer now has a chance to deploy the network to production. In this realization, our query server takes the network graph and allows the graph to be queried at runtime, such as by receiving queries from the users 210a . . . 210n.

With the query server 250 operational on the insurer's website, questions can now be asked of the network graph. When a consumer types a question about insurance, the query is routed to the query server 250 that then looks up the closest nodes. If those close nodes are associated with a particular answer (directly, or through kriging weight), then the query server returns that particular answer to the consumer.

If no answer can be retrieved, the question is captured by the system. Questions with no answers in the network can be anything. In this example, a user 210a provides a question about a new insurance product launched after the initial network graph was constructed. The system learns by allowing these new queries posed by live consumers to be linked with additional or existing answers.

The system learns by simply adding new questions and answers to the graph. These questions and answers can be learned as part of a batch process, or by being "folded in" to the system dynamically, rebuilding the graph to include new input data based on the new questions and answers. New answers are typically gathered as part of an escalation process—the machine cannot find an answer for a question, and calls out to a human operator. The answer given by the human operator is saved as a potential answer to the query posed by the human client. In one instantiation, this answer is not learned until is the answer has been approved by a human approver. In another instantiation, this machine learns as soon as the new answer is given.

After the previously unobserved question is linked with a new answer, the graph builder on the graph creation server 201 is run again. This time, the network incorporates the new question and the new answer into the graph. Again, the new network graph can be studied for any kind of suboptimal behaviour. If none is found, then deployment of the new network graph into the query server can begin. In this way, knowledge about the new insurance product is made available to a semi-supervised answering machine.

The query server 250 is spun up and questions asked on the insurer's website are routed to the new network graph. Now, when a consumer asks a similar question about the insurance company's new product, the query server can answer the question.

Figure 5:
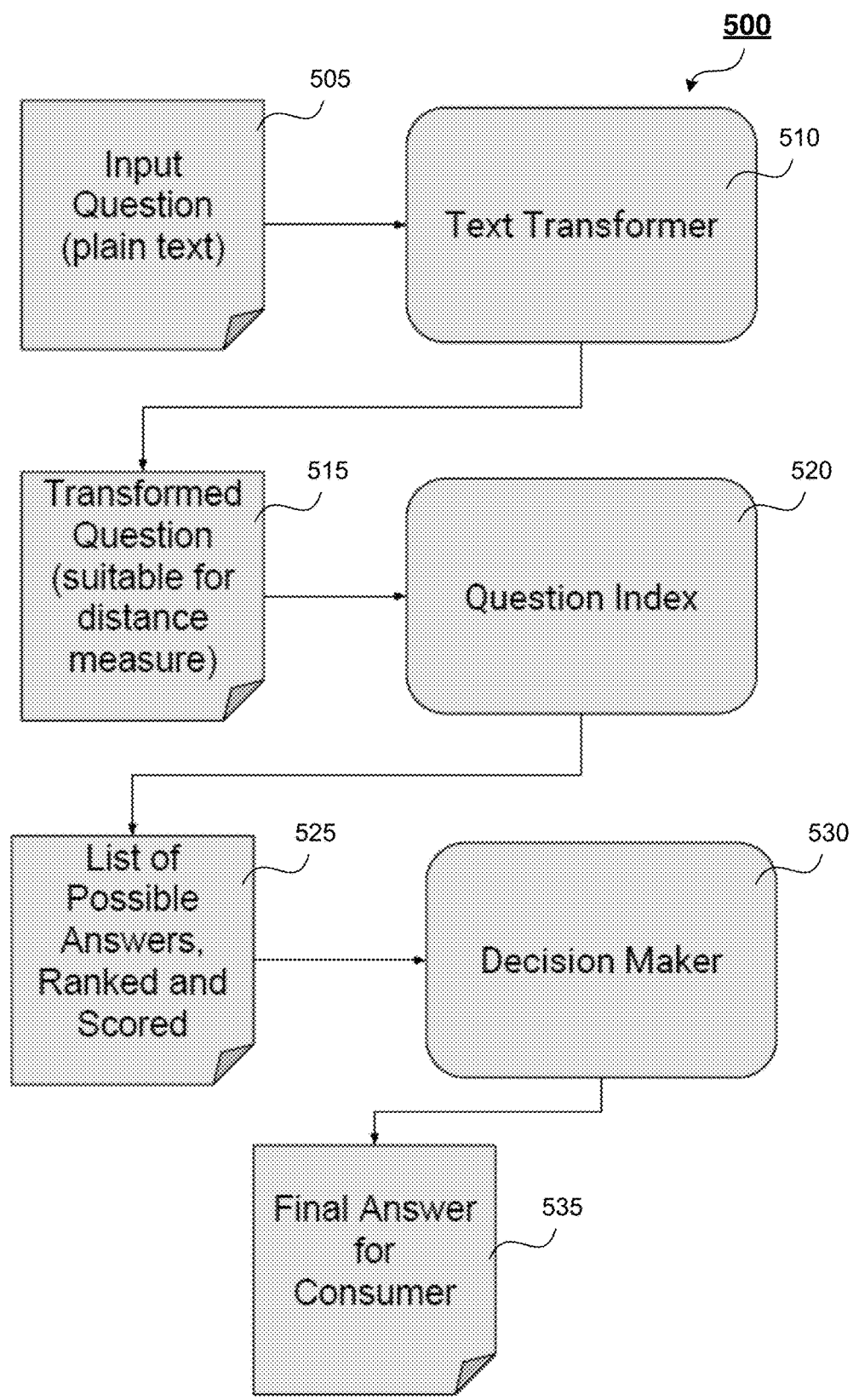
FIG. 5 is a flow diagram of a method for utilizing semi-supervised machine learning.

FIG. 5 is a flow diagram illustrating a method 500 for processing a query received from a user. Step 505 receives an input question from a user, presented in plain text. The plain text query is presented to a text transformer 510, which transforms the query into a transformed text question 515 that is suitable for distance measuring. The transformed question is presented to a question index 520, which generates a list of possible answers 525, which are ranked and scored. A decision maker 530 receives the list of possible answers 525 and determines a final answer 535 to the input question for the user.

Figure 6:
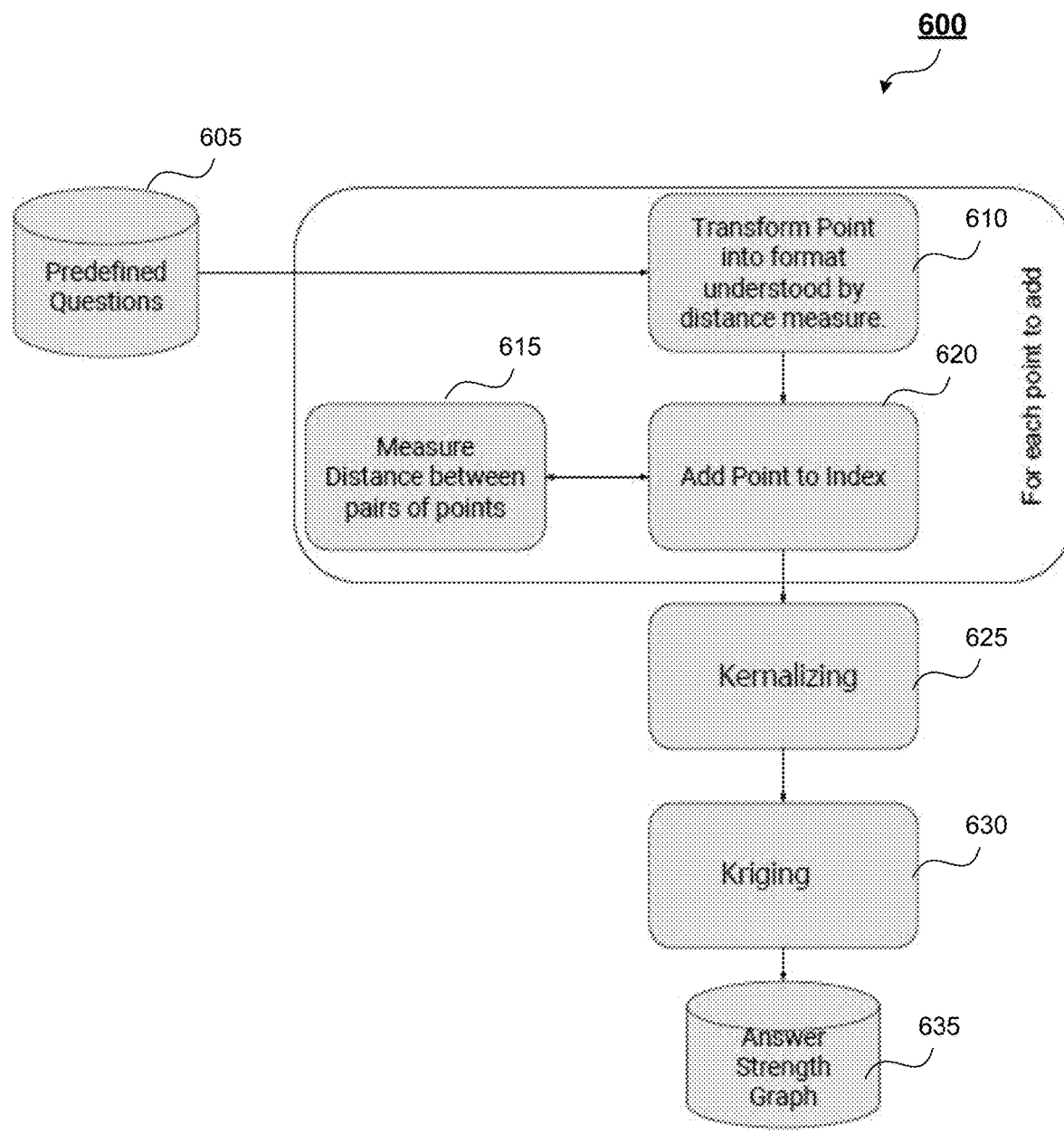
FIG. 6 is a flow diagram of a method for creating a graph.

FIG. 6 is a flow diagram of a method 600 for creating a graph. Predefined questions 605 are presented as an input to step 610, which transforms a point into a format understood by distance measure. Each question only generates a single point on the graph, regardless of how much text is in the question, or the type of language used in the question. Step 620 adds a point to an index, with step 615 measuring distances between pairs of points. Steps 610, 620, 615 are repeated for each point to be added. Once each point has been added to the graph, step 625 performs kernelizing and then kriging is performed in step 630 to distribute the points throughout the graph, before the method 600 returns an answer strength graph 635.

In order for kriging to work mathematically, the method transforms the distance measurement into something that would be positive definite if the graph is treated as a full-rank matrix. This turns the distance measure into a value where a large number (potentially an infinite one) means points are far from each other, into a measure where points infinitely far apart are given a value of zero. Likewise, for a distance measure, a value of zero means the two points are identical—but identical points are valued as 1 by the kernalized measure. This new number makes propagation of answer strengths through the graph straightforward.

If the method finds an exact match for a question (that is, the question is perfectly matched with a previously seen question with an existing answer), then the method multiplies the answer weight (1) with the kernelized measure (also 1), giving an answer weight of 1. If the new question only half matches the existing already-seen answer, then this produces a kernelized measure of 0.5, which the method multiplies with the answer weight (1) for a total value of 0.5—showing that there is only a 50 percent confidence measure associated with the proposed answer. Note that, because of the kriging, answer weights on the graph can vary. If two points in the graph are only 50 percent similar, but share a link, answer weights added to one node will be propagated to the neighbour—but with a weight in one realization of 0.5. Note that this is the simplest possible method of propagating weights throughout a graph; many other more sophisticated kriging methods are available.

Figure 8:
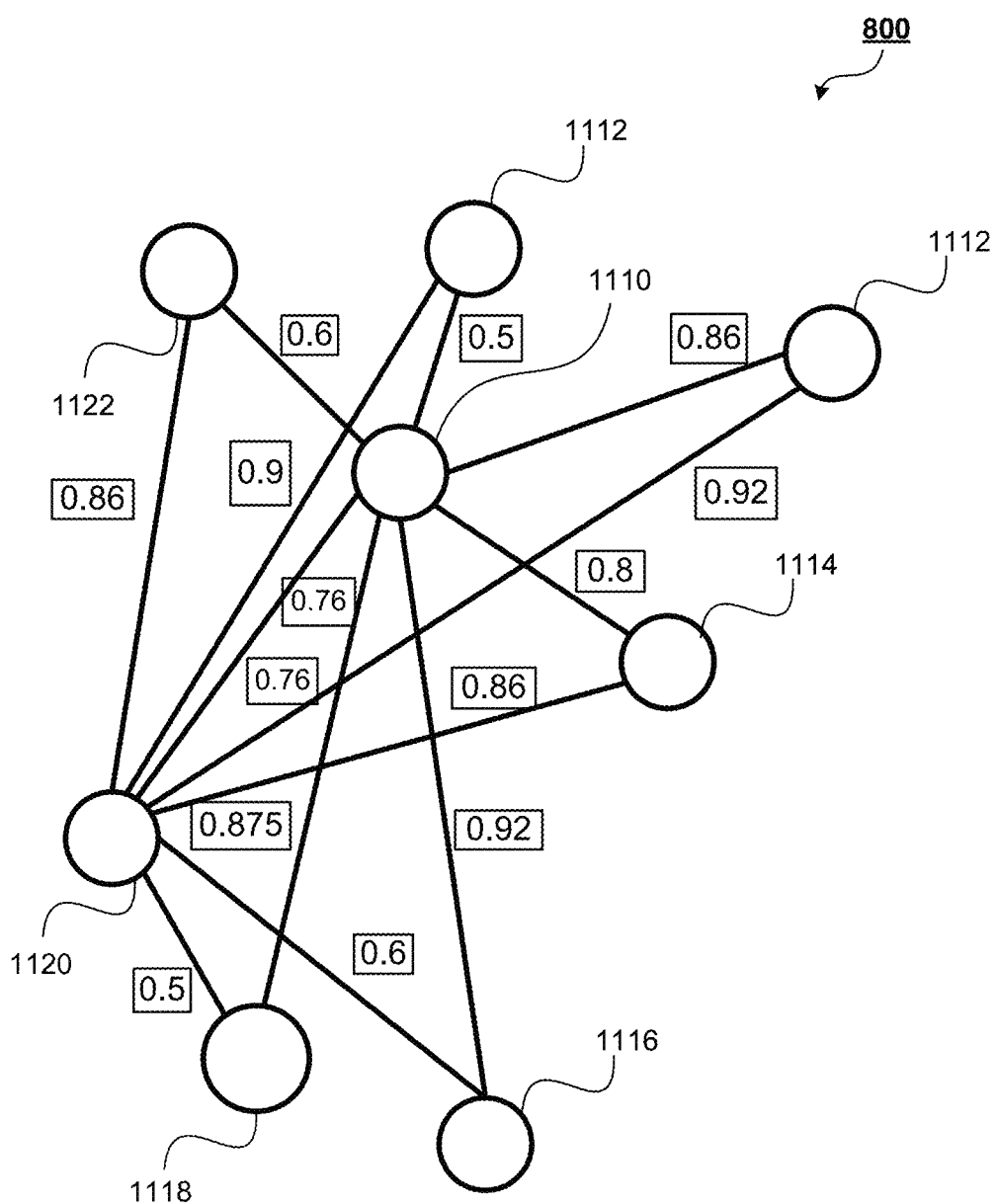
FIGS. 8 to 10 illustrate a graph that includes a set of nodes and links.

FIG. 8 shows a graph 800 that has been created based on a set of input data, the graph 800 contains a set of nodes 1100, 1112, 1114, 1116, 1118, 1120, 1122 corresponding to various input data that have been transformed and projected into a particular searchable index represented by the graph 800. The nodes 1100, 1112, 1114, 1116, 1118, 1120, 1122 are linked by the distances between each pair of nodes.

Figure 9:
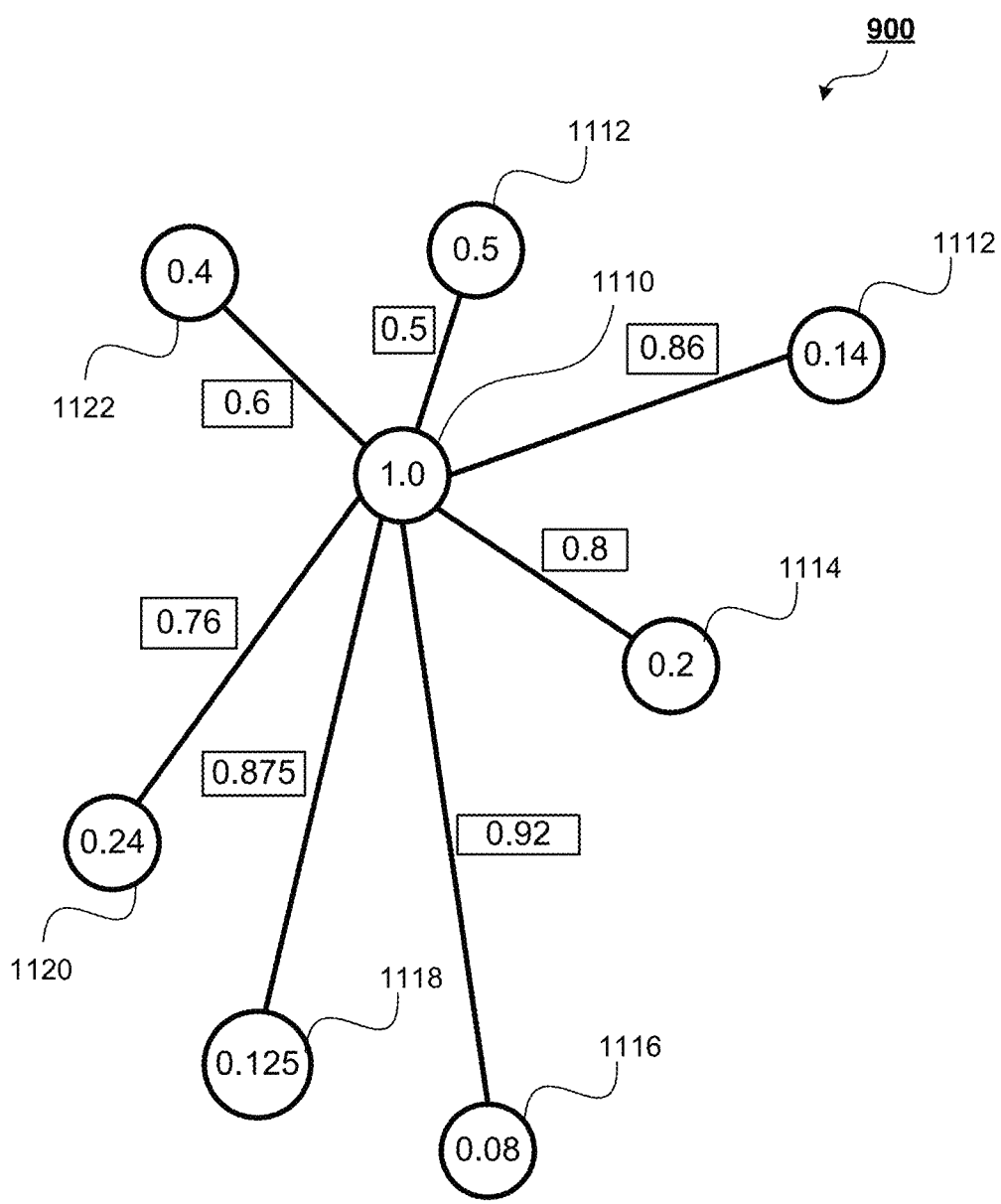

FIG. 9 shows a simplified graph portion 900 taken from graph 800 and representing answer weights in relation to a particular seen question and its associated seen answer. In the example of FIG. 9, node 1110 corresponds to a seen question that is associated with a seen answer and thus node 1110 is associated with an answer weight in relation to that seen question of 1.0. Other nodes are assigned answer weights for that particular seen question, based on their respective distances from the node 1110.

In this simplified example, the answer weight for a given node is determined by multiplying a nominal answer weight (in this case, 1.0) by one minus the distance of that given node from the node associated with the seen answer (in this case, node 1110). Thus, node 1114, which has a distance of 5 from node 1110, has an answer weight of 0.2 for that seen question. Similarly, node 1116 has a distance of 12 from node 1110 and has an answer weight of 0.08. Thus, each node 1100, 1112, 1114, 1116, 1118, 1120, 1122 has an associated answer weight in relation to a particular seen answer associated with a node corresponding to a seen question.

Figure 10:
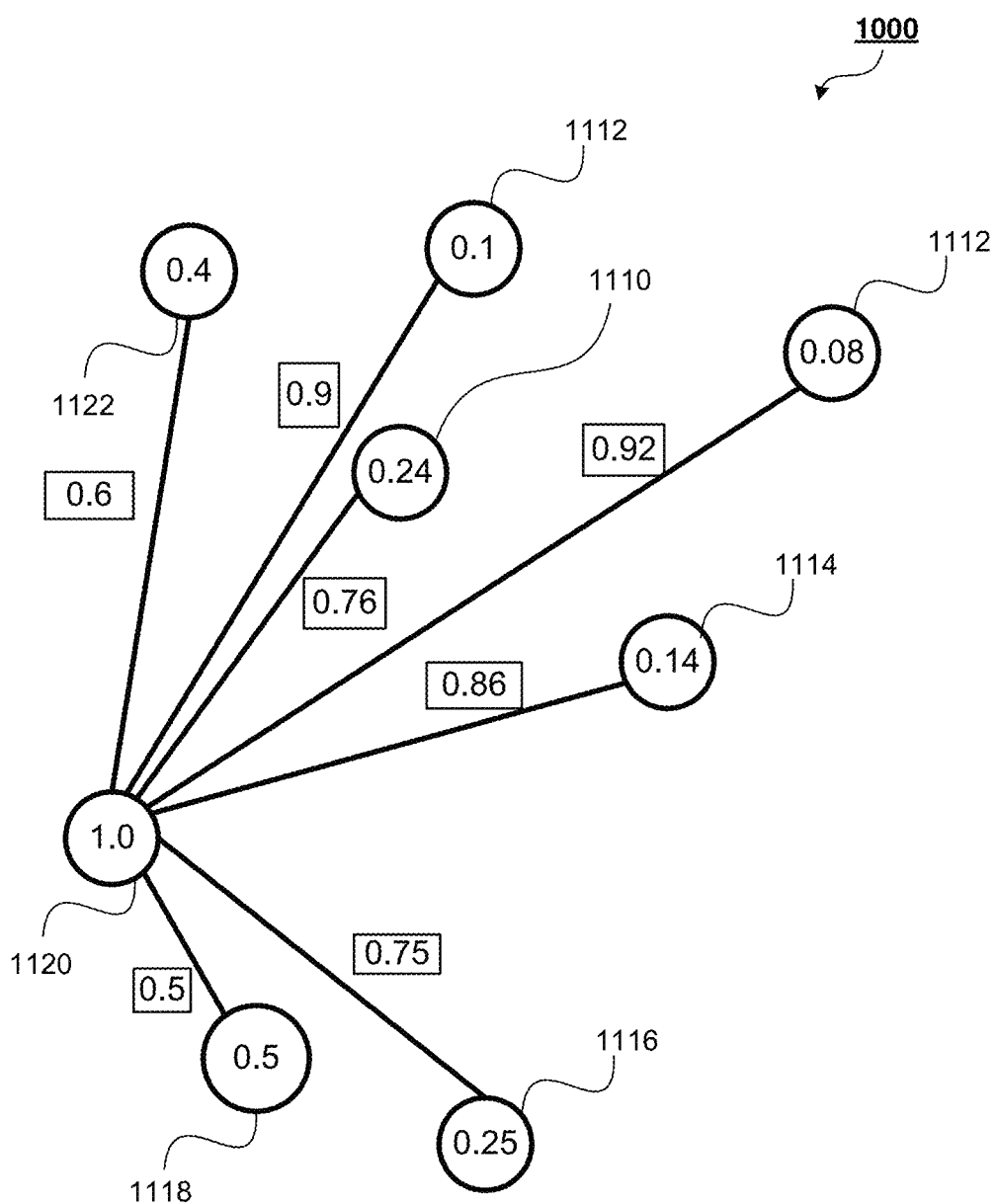

FIG. 10 shows a simplified graph 1000 containing the same set of nodes 1100, 1112, 1114, 1116, 1118, 1120, 1122 from the graphs 800 and 900, but shown in relation to a seen answer associated with node 1120 corresponding to a different seen question. As node 1120 is associated with the seen answer, node 1120 is assigned an answer weight of 1.0 for that seen answer. Each of the other nodes 1100, 1112, 1114, 1116, 1118, 1122 is allocated an associated answer weight in relation to this seen answer, based on the respective distances of those other nodes from node 1120.

As noted above, FIG. 7 is a schematic representation of information flow 700 during query runtime. A client machine 710 includes a client service 712. In this embodiment, the client machine 710 is coupled to a messaging queue 720. The client service 712 provides a question to the messaging queue 720, which forwards the question to a question transformer 732 in a first server 730. The question transformer returned transformed text derived from the question to the messaging queue 720, which then presents the transformed text to a question index lookup module 742 in a second server 740. The question index lookup module 742 identifies closest nodes in a graph to the transformed text and returns a set of closest nodes to the messaging queue 720.

Figure 11:
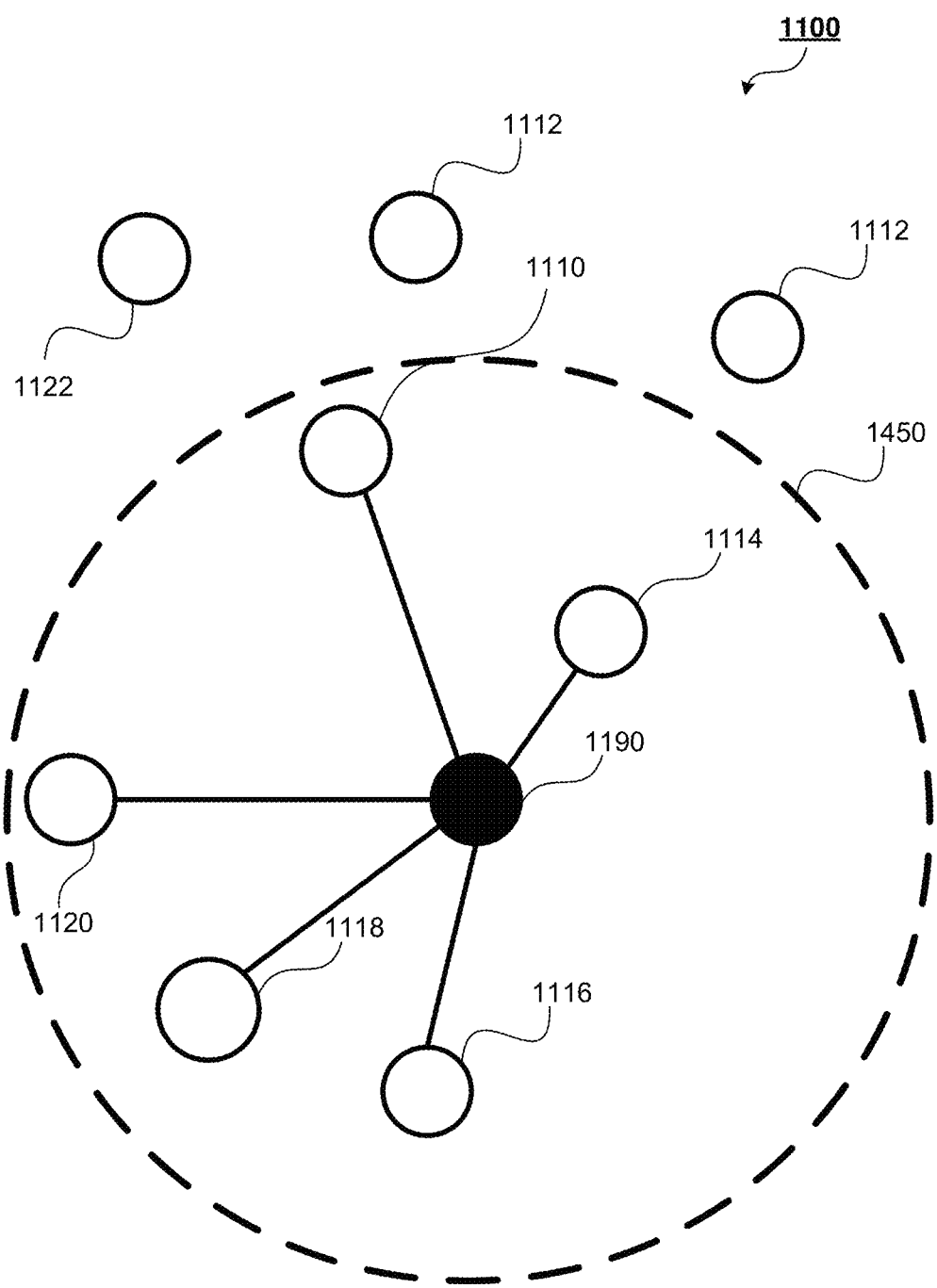
FIG. 11 illustrates a graph into which a question is projected during runtime to identify an answer.

FIG. 11 shows the graph 800 into which has been projected a new question during runtime. The new question is projected to a projected location, represented by a new question node 1190. In order to identify within the network an answer to the new question, the method examines all nodes within a retrieval radius 1450 associated with the new question. In this particular example, nodes 1110, 1114, 1116, 1118, and 1120 are located within the retrieval radius of the new question node 1400.

Each of the retrieved nodes 1110, 1114, 1116, 1118, 1120 is associated with a set of answer weights for a corresponding set of answers. As seen from FIGS. 9 and 10, for example, node 1110 has an answer weight of 1.0 for a first answer (shown in FIG. 9) and an answer weight of 0.24 for a second answer (shown in FIG. 10). The answer weights associated with node 1110 are adjusted based on the distance of node 1110 from the new question node 1190 to produce a set of answer weights associated with node 1110 for the new question. Similarly, a set of answer weights for the new question is determined for each retrieved node.

Returning to FIG. 7, the messaging queue 720 forwards the set of closest nodes to a decision maker 752 in a third server 750. The set of closest nodes includes the nodes associated with the highest answer weights. The number of nodes in the set of closest nodes is application specific and may be predefined or user defined. The decision maker 752 identifies the node having the highest answer weight from the set of closest nodes and returns the node with the highest answer weight to the messaging queue 720 for forwarding to the client service 712. Whilst the example of FIG. 7 shows the question transformer 732, question index lookup 742 and decision maker 752 as residing on separate servers 730, 740, 750, other implementations may use an integrated solution using a single query server, such as that shown logically as query server 250 of FIG. 2. Various distributed or integrated architectures may be implemented without departing from the spirit and scope of the present disclosure.

INDUSTRIAL APPLICABILITY

The arrangements described are applicable to the computer industries and particularly for the customer service industries.

The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

The invention claimed is:

1. A method for performing semi-supervised question answering, comprising the steps of:
   (i) creating a graph based on input data, said input data comprising natural language text that includes seen questions, background text, and seen answers, wherein creating the graph includes the steps of:
   transforming said input data into transformed text strings;
   comparing said transformed text strings to determine distances between said transformed text strings;
   structuring said transformed text strings and distances into a searchable graph, each text string having a corresponding node in said graph;
   matching nodes in the graph corresponding to seen questions with their corresponding seen answers;
   allocating, for each seen question, a standardised answer weight to the node in the graph that corresponds to that seen question; and
   propagating answer weights throughout the graph, such that for each seen question, the node in the graph corresponding to that seen question has a standardised answer weight for that seen question and neighbouring nodes in the graph have corresponding adjusted answer weights based on their respective distances from the node in the graph corresponding to the seen question;
   (ii) querying said graph in response to a new question, including the steps of:
   projecting said new question into said graph to a projected location; and
   for each node in a retrieval radius associated with the new question, determining a set of answer weights based on the distances between retrieved nodes and said projected location and answer weights associated with retrieved nodes based on seen questions; and
   determining a best response corresponding to the seen answer associated with a highest answer weight from said set of answer weights determined for each retrieved node within the retrieval radius.

2. The method according to claim 1, wherein propagating answer weights throughout the graph is performed using a Kriging engine.

3. The method according to claim 1, wherein said new question is one of a seen question and an unseen question.

4. The method according to claim 1, wherein said input data includes a set of questions.

5. The method according to claim 1, wherein said input data includes a set of one or more files.

6. The method according to claim 1, wherein said structure is a matrix.

7. The method according to claim 6, wherein said matrix is weighted using a TF-IDF transform.

8. The method according to claim 1, wherein string kernels are used as a distance measure.

9. The method according to claim 1 wherein escalating said question transfers a caller associated with said question to a human operator.

10. The method according to claim 1 wherein escalating said question generates a prompt to a caller associated with said question, said prompt asking said caller to rephrase the question.

11. A system for performing semi-supervised question answering, comprising:

a graph creation builder adapted to create a graph based on input data, said input data comprising natural language text that includes seen questions, background text, and seen answers, wherein said graph creation builder includes:

a translation pipeline for transforming received input data into transformed text strings suitable for machine comparison;

a distance method processing module for comparing said transformed text strings to determine distances between said transformed text strings;

an indexing system for structuring said transformed text strings and distances into a searchable graph, each text string having a corresponding node in said graph; and a kriging engine for:

matching nodes in the graph corresponding to seen questions with their corresponding seen answers;

allocating, for each seen question, a standardised answer weight to the node in the graph that corresponds to that seen question; and propagating answer weights throughout the graph, such that for each seen question, the node in the graph corresponding to that seen question has a standardised answer weight for that seen question and neighbouring nodes in the graph have corresponding adjusted answer weights based on their respective distances from the node in the graph corresponding to the seen question;

a query engine adapted to query said graph in response to a new question, said query engine including computer readable instructions that when executed on a processor of said query engine perform the steps of:

projecting said new question into said graph to a projected location; and for each node in a retrieval radius associated with the new question, determining a set of answer weights based on the distances between retrieved nodes and said projected location and answer weights associated with retrieved nodes based on seen questions; and determining a best response corresponding to the seen answer associated with a highest answer weight from said set of answer weights determined for each retrieved node within the retrieval radius.

12. The system according to claim 11, wherein said new question is one of a seen question and an unseen question.

13. The system according to claim 11, wherein said input data includes a set of questions.

14. The system according to claim 11, wherein said input data includes a set of one or more files.

15. The system according to claim 11, wherein said structure is a matrix.

16. The system according to claim 15, wherein said matrix is weighted using a TF-IDF transform.

17. The system according to claim 11, wherein string kernels are used as distance measures.

* * * * *